United States Patent
Lin et al.

(10) Patent No.: US 11,366,268 B2
(45) Date of Patent: Jun. 21, 2022

(54) METHOD AND DEVICE FOR SUBSTANTIALLY ELIMINATING OPTICAL DAMAGE IN LITHIUM NIOBATE DEVICES

(71) Applicant: University of Rochester, Rochester, NY (US)

(72) Inventors: Qiang Lin, Rochester, NY (US); Jingwei Ling, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 17/019,485

(22) Filed: Sep. 14, 2020

(65) Prior Publication Data

US 2022/0082755 A1    Mar. 17, 2022

(51) Int. Cl.
*G02B 6/12* (2006.01)
*G02B 6/13* (2006.01)
*G02B 6/293* (2006.01)

(52) U.S. Cl.
CPC ........... *G02B 6/12007* (2013.01); *G02B 6/13* (2013.01); *G02B 6/29338* (2013.01); *G02B 2006/1204* (2013.01); *G02B 2006/12038* (2013.01)

(58) Field of Classification Search
CPC .............................................. G02B 2006/1204
See application file for complete search history.

(56) References Cited

U.S. PATENT DOCUMENTS 6,195,191 B1 *  2/2001  Osenbach ............... G02F 1/225
                                                    359/322

FOREIGN PATENT DOCUMENTS

| JP | 2004126399 A | * | 4/2004 |
| JP | 2008065030 A | * | 3/2008 |
| JP | 6322883 B2 | * | 5/2018 |

OTHER PUBLICATIONS

Boes et al., Status and Potential of Lithium Niobate on Insulator (LNOI) for Photonic Integrated Circuits, Photonic Integrated Circuits (Year: 2018).*
Ling et al., Athermal lithium niobate microresonator, Optical Express, Jul. 2020 (Year: 2020).*
Wooten, E.L., et al., "A Review of Lithium Niobate Modulators for Fiber-Optic Communications," 2000, IEEE Journal of Selected Topics in Quantum Electronics, vol. 6, No. 1 (pp. 69-82).
Arizmendi, L., "Photonic applications of lithium niobate crystals," 2004, Phys. Stat. Sol. (a) 201 No. 2 (pp. 253-283).
Myers,L. E., et al., "Quasi-phase-matched optical parametric oscillators in bulk periodically poled LiNbO$_3$," 1995, J. Opt. Soc. Am. B, vol. 12, No. 11 (pp. 2102-2116).
Lam, C.S., "A Review of the Timing and Filtering Technologies in Smartphones," 2016, IEEE International Frequency Control Symposium (pp. 1-6).

(Continued)

*Primary Examiner* — Charlie Y Peng
(74) *Attorney, Agent, or Firm* — Harris Beach PLLC

(57) ABSTRACT

An integrated optical device includes a substrate. A waveguide includes a lithium niobate. A TiO$_2$ coating is disposed at least in part over a longitudinal surface of the waveguide as a coated waveguide supported by the substrate. A silicon oxide substantially can cover and surround the waveguide in cross section over a longitudinal direction of said waveguide as an optical cladding. A method for substantially eliminating optical damage in lithium niobate devices is also described.

21 Claims, 13 Drawing Sheets

(56) References Cited

OTHER PUBLICATIONS

Kong, Y., et al., "Recent Advances in the Photorefraction of Doped Lithium Niobate Crystals," 2012, Materials, vol. 5 (pp. 1954-1971).
Kösters, M., et al., "Optical cleaning of congruent lithium niobate crystals," 2009, Nature Photonics, vol. 3 (pp. 510-513).
Djordjevic, S. S., et al., "CMOS-compatible, athermal silicon ring modulators clad with titanium dioxide," 2013, Opt. Express, vol. 21 (pp. 13958-13968).
Guha, B., et al., "Athermal silicon microring resonators with titanium oxide cladding," 2013, Opt. Express, vol. 21 (pp. 26557-26563).
Qiu, F., et al., "Complementary metal-oxide-semiconductor compatible athermal silicon nitride/titanium dioxide hyrbid micro-ring resonators," 2013, Applied Physics Letters, vol. 102 (pp. 051106-1-051106-3).
Feng, S., et al., "Athermal silicon ring resonators clad with titanium dioxide for 1.3 µm wavelength operation," 2015, Opt. Express, vol. 23 (pp. 25653-25660).
Teng, J., et al., "Athermal Silicon-on-insulator ring resonators by overlaying a polymer cladding on narrowed waveguides," 2009, Opt. Express, vol. 17 (pp. 14627-14633).
Lipka, T., et al., "Athermal and wavelength-trimmable photonic filters based on $TiO_2$-cladded amorphous-SOI," 2015, Opt. Express, vol. 23, (pp. 20075-20088).

\* cited by examiner

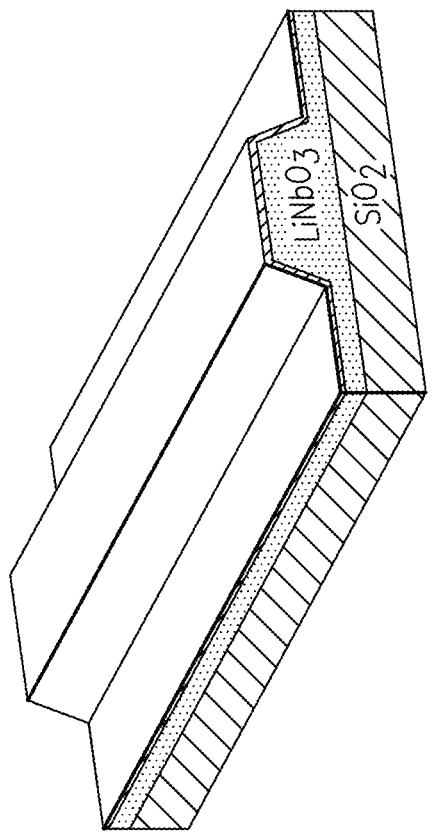
FIG.1C
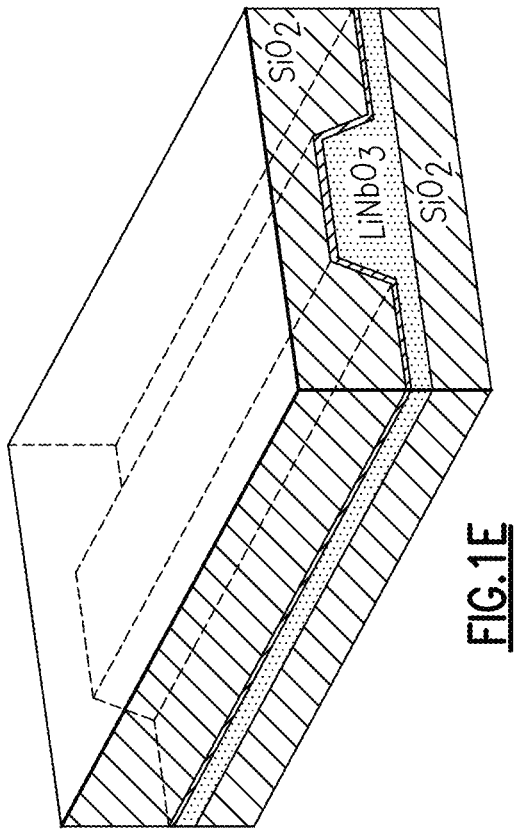
FIG.1E
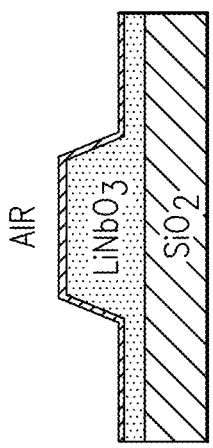
FIG.1B
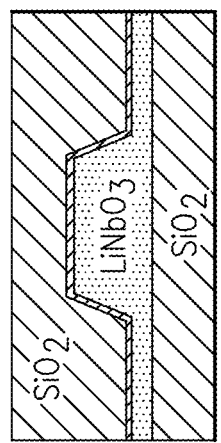
FIG.1D
FIG.1A

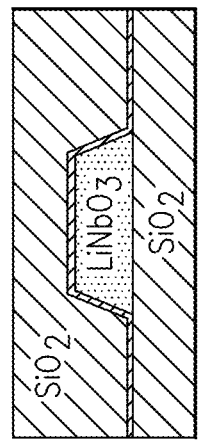
FIG.2C
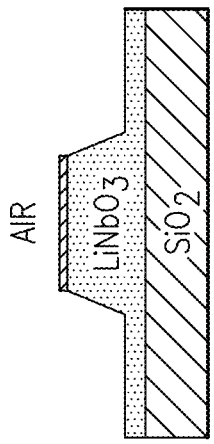
FIG.2F
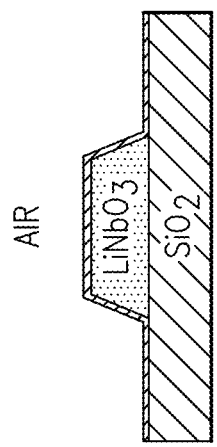
FIG.2B
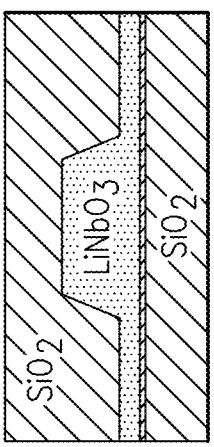
FIG.2E
FIG.2A
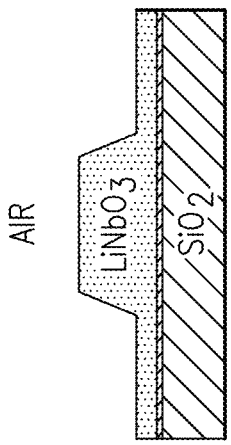
FIG.2D

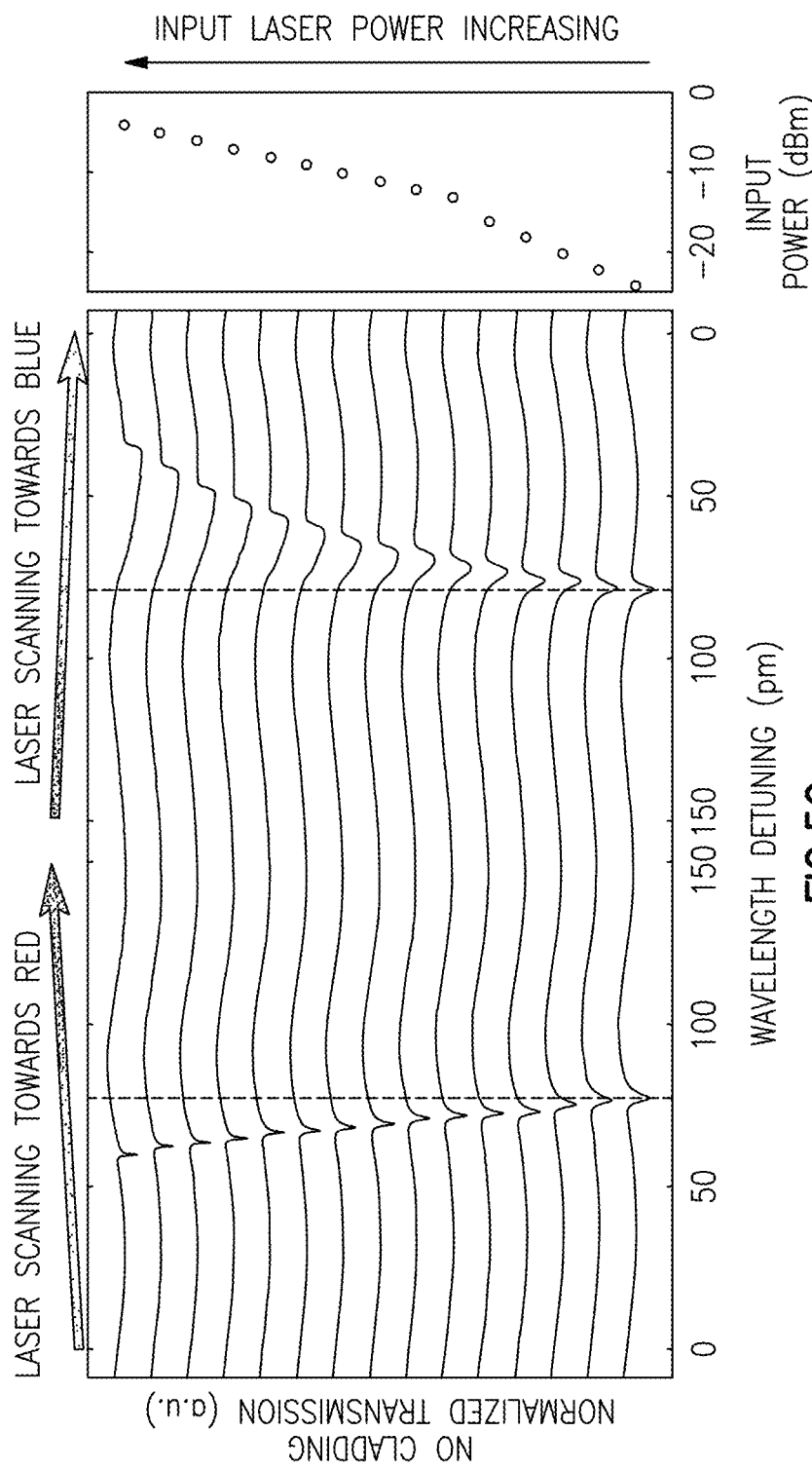

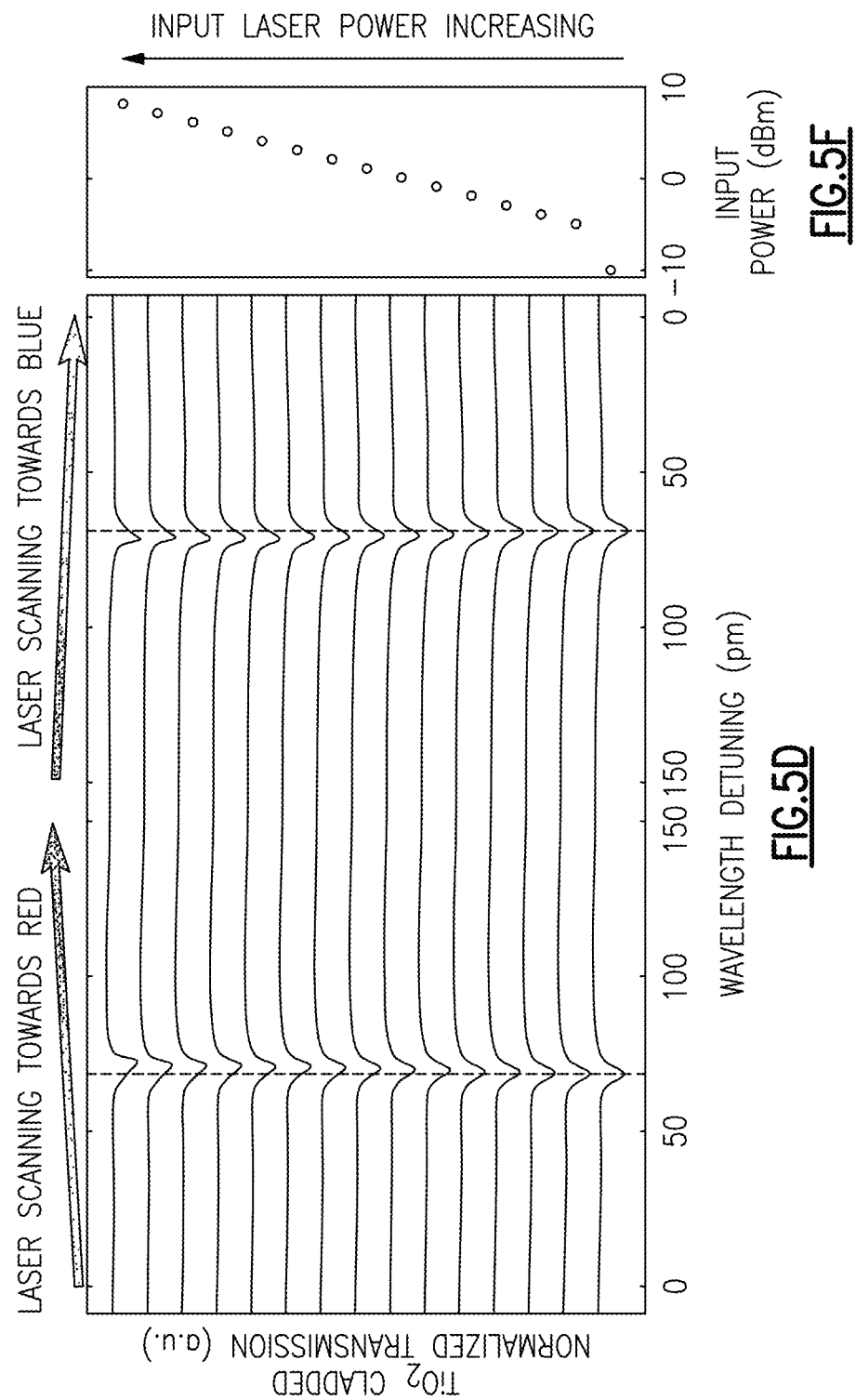

FIG.6A
TiO₂
LiNbO₃
SiO₂
Si
SAPPHIRE
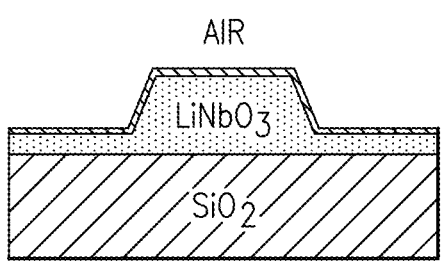
FIG.6B
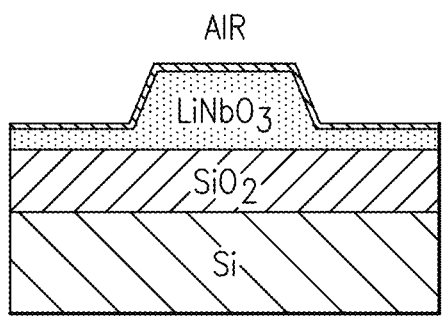
FIG.6D
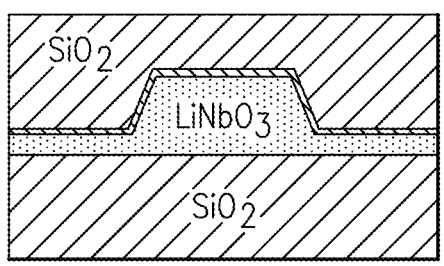
FIG.6C
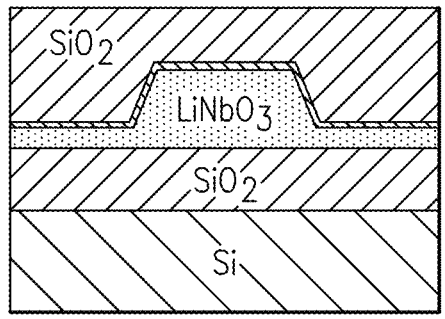
FIG.6E

US 11,366,268 B2

METHOD AND DEVICE FOR SUBSTANTIALLY ELIMINATING OPTICAL DAMAGE IN LITHIUM NIOBATE DEVICES

FIELD OF THE APPLICATION

The application relates to waveguide devices, particularly to waveguide devices which are susceptible to optical damage caused by optical intensity.

BACKGROUND

In the background, other than the bolded paragraph numbers, non-bolded square brackets ("[ ]") refer to the citations listed hereinbelow.

Lithium niobate (LN) is a workhorse material system for the photonics industry and for photonics research and development. LN has a wide range of useful properties including electro-optic effect, optical nonlinearities, acousto-optic effect, piezoelectricity that have found broad applications such as high-speed signal modulation in lightwave communications, frequency conversion in commercial lasers, signal filtering in RF/microwave electronics [1, 2, 3, 4], to name a few. However, LN exhibits a strong photorefractive effect that induces optical damage when the optical intensity becomes significant inside the material [5].

SUMMARY

An integrated optical device includes a substrate. A waveguide includes a lithium niobate. A $TiO_2$ coating is disposed at least in part over a longitudinal surface of the waveguide as a coated waveguide supported by the substrate.

The waveguide can be supported by a silicon substrate. The waveguide can be supported by a silicon oxide substrate. The waveguide can be supported by a lithium niobate substrate. The waveguide can be supported by a sapphire substrate.

The $TiO_2$ coating can include a thin-layer of $TiO_2$ having a thickness between about 1 nm and 1000 nm. The $TiO_2$ coating can be disposed between the waveguide and a silicon oxide substrate.

The integrated optical device can further include a silicon oxide cladding disposed over a top surface of the waveguide. The integrated optical device can further include a silicon oxide cladding disposed over the $TiO_2$ coating.

The waveguide can include a ring resonator. The $TiO_2$ coating causes a resonance wavelength of the ring resonator to be more stable with temperature compared to a same dimensioned LN ring resonator without the $TiO_2$ coating. A wavelength of a cavity resonance can remain substantially unaffected for optical power up to about 6.1 W inside the resonator. The ring resonator can include an optical Q up to about $4 \times 10^5$, wherein a photorefractive effect is substantially eliminated by the $TiO_2$ coating.

A device cross section of a bottom surface of the waveguide can be disposed on a $SiO_2$ substrate, the $TiO_2$ coating substantially covering a top surface of the waveguide, and a $TiO_2$ coating top surface exposed to an air. A device cross section of a bottom surface of the waveguide can be disposed on a $SiO_2$ substrate, the $TiO_2$ coating substantially covering a top surface of the waveguide, and a $TiO_2$ top surface covered by $SiO_2$ layer. A device cross section of a $TiO_2$ coating can be disposed between a $SiO_2$ substrate and the waveguide. A device cross section of a bottom surface of the waveguide can be disposed on a $SiO_2$ substrate, and the $TiO_2$ coating is disposed on at least a right side or a left side of the waveguide, wherein a $SiO_2$ layer or an air covers a top surface of the waveguide. A device cross section can include $SiO_2$ surrounding the device.

An integrated optical device includes a waveguide including a lithium niobate. A $TiO_2$ coating is disposed at least in part over a surface of the waveguide on at least either of a top surface of the waveguide or a bottom surface of the waveguide. A silicon oxide substantially covers and surrounds the waveguide in cross section over a longitudinal direction of the waveguide as an optical cladding.

A method for substantially eliminating optical damage in lithium niobate devices includes: providing a substrate; performing at least one of: fabricating a waveguide including a lithium niobate on the substrate, and depositing a $TiO_2$ coating over at least a part of a side along a longitudinal length of the waveguide, or depositing a $TiO_2$ coating over at least a portion of the substrate and fabricating the waveguide on the $TiO_2$ coating; thereby substantially eliminating a photorefractive effect in the lithium niobate waveguide.

An integrated optical device includes a substrate. A waveguide includes a lithium niobate. A coating is disposed at least in part over a longitudinal surface of the waveguide as a coated waveguide supported by the substrate. The coating includes at least one of: a silicon (Si), a zinc oxide (ZnO), a zirconium dioxide ($ZrO_2$), a tin oxide ($SnO_2$), and an indium tin oxide (ITO).

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1A is a drawing showing a legend of materials which follow in FIG. 1B to FIG. 1E;

FIG. 1B is a drawing showing a cross section of a waveguide including a coating of a thin-layer of titanium oxide on a surface of lithium niobate according to the Application;

FIG. 1C is a drawing showing a three dimensional cross section of the waveguide of FIG. 1B;

FIG. 1D is a drawing showing a cross section of another type of waveguide including a coating of a thin-layer of titanium oxide on a surface of lithium niobate according to the Application;

FIG. 1E is a drawing showing a three dimensional cross section of the waveguide of FIG. 1D;

FIG. 2A is a drawing showing a legend of materials which follow in FIG. 2B to FIG. 2K;

FIG. 2B is a drawing showing an exemplary ridge-like waveguide geometry;

FIG. 2C is a drawing showing another exemplary ridge-like waveguide geometry;

FIG. 2D is a drawing showing an exemplary waveguide structure where the titanium oxide layer can be placed beneath the LN layer;

FIG. 2E is a drawing showing another exemplary waveguide structure where the titanium oxide layer can be placed beneath the LN layer;

FIG. 2F is a drawing showing an exemplary waveguide structure which can be partially covered with titanium oxide;

FIG. 5C is a graph showing normalized transmission with no cladding;

FIG. 5D is a graph showing normalized transmission with a $TiO_2$ cladding;

FIG. 5E is a graph showing input laser power for the graph of FIG. 5C;

FIG. 5F is a graph showing input laser power for the graph of FIG. 5D;

FIG. 6A is a drawing showing a legend of materials which follow in FIG. 6B to FIG. 6I;

FIG. 6B shows an exemplary waveguide with $TiO_2$ cladding supported by a silicon oxide substrate ($SiO_2$ included in our definition of silicon oxide);

FIG. 6C shows the structure of FIG. 6B with an additional layer of $SiO_2$ over the $TiO_2$ cladding (on top of the $TiO_2$ cladded waveguide);

FIG. 6D shows an exemplary waveguide with $TiO_2$ cladding supported by a buried oxide on a silicon substrate;

FIG. 6E shows the structure of FIG. 6D with an additional layer of $SiO_2$ over the $TiO_2$ cladding (on top of the $TiO_2$ cladded waveguide);

DETAILED DESCRIPTION

Figure 2G:
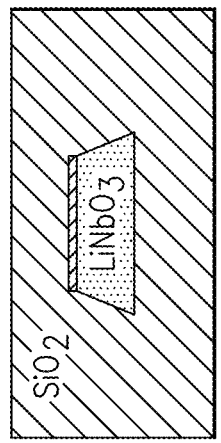
FIG. 2G is a drawing showing another exemplary waveguide structure which can be partially covered with titanium oxide.

In the description, other than the bolded paragraph numbers, non-bolded square brackets ("[ ]") refer to the citations listed hereinbelow.

Definitions

Silicon Oxide—A silicon oxide includes a silicon monoxide and the more common silicon dioxide ($SiO_2$), such as can be used for a substrate or cladding for an optical integrated structure.

Cross section—The cross section views include a variety of layers, coatings, and/or a cladding. It is understood that at least one face surface of the cross section view is typically not covered or coated where the face of the cross section is in the optical transmission path.

Longitudinal direction (longitudinal direction of a waveguide)—The longitudinal direction of a waveguide is the long direction of the travel of light through the waveguide. For a straight waveguide, the longitudinal direction is about perpendicular ("into or out of the page") to the cross section view. The longitudinal direction of a ring resonator is along the circumference (direction of travel of light in the ring).

Integrated device—integrated optical devices, including integrated optoelectronic devices, photonic integrated circuits (PIC), and planar lightwave circuits. An integrated waveguide, and a ring resonator as described hereinbelow, are but two examples of integrated devices.

Supported by the substrate—Supported by the substrate is used to indicate that the waveguide coated or clad by $TiO_2$ is directly or indirectly physically or mechanically supported by the substrate as an integrated device. The waveguide coated or clad by $TiO_2$ can be disposed directly on the substrate, or there can be any suitable number and type or types of intermediate layers between the waveguide coated or clad by $TiO_2$ and the substrate. Also, with reference to a substrate at the "bottom" of the structure, the $TiO_2$ coating can be above the waveguide (e.g. FIG. 2B), or below the waveguide (e.g. FIG. 2D). For example, the $TiO_2$ coating can be disposed between the bottom of the LN waveguide and a $SiO_2$ layer on top of the substrate (e.g. FIG. 2E). Note that in some structures according to the Application, the LN waveguide is disposed on (typically bonded to, where the LN waveguide is etched from a LN layer) a low index layer (e.g. $SiO_2$) which is on the substrate (e.g. a Si or LN substrate).

An integrated waveguide, for example, typically has a cross section at either end of the planar waveguide. The cross section of a ring resonator applies both to the optical path of the ring, as well as a portion of a side of the ring resonator which typically tangentially optically couples to another, typically about linear or about straight waveguide (which can also include a slight curve to follow the ring shape, as shown, for example, in FIG. 3C).

Fabricating the waveguide—The LN waveguide of the Application is typically etched from a LN layer, such as an LN layer provided on a commercial wafer which is supplied with one or more layers already bonded to a substrate. Typically, the LN layer from which the LN waveguide is fabricated is bonded to the substrate, or is bonded to another layer which is bonded directly or indirectly to the substrate. Any suitable LN waveguide fabrication method can be used. In structures where the waveguide is fabricated over the $TiO_2$ coating, the waveguide can be attached or bonded to the $TiO_2$ coating. Or, a LN layer can be attached to the $TiO_2$ coating and the waveguide then fabricated from the LN layer, typically by any suitable lithography technique and etching.

This Application is in three parts. Part 1 describes the problem of optical damage caused by the photorefractive effect. Part 2 describes the new solution of the Application, where a thin-layer of titanium oxide $TiO_2$ substantially eliminates the photorefractive effect in thin-film lithium niobate. Part 3 describes verification experiments.

Part 1—Optical Damage Caused by the Photorefractive Effect

As described hereinabove, lithium niobate (LN) is a workhorse material system for the photonics industry and for photonics research and development. LN has a wide range of useful properties including electro-optic effect, optical nonlinearities, acousto-optic effect, piezoelectricity that have found broad applications such as high-speed signal modulation in lightwave communications, frequency conversion in commercial lasers, signal filtering in RF/microwave electronics [1, 2, 3, 4], to name a few.

Unfortunately, LN exhibits a strong photorefractive effect that induces optical damage when the optical intensity becomes significant inside the material [5]. Photorefractive-induced optical damage has become the major challenge for the application of LN devices in the high-power regime. In the prior art, to mitigate this issue, the LN crystal has either to be doped with certain ions (such as Mg) via a sophisticated doping process to increase the threshold of optical damage [6], or to be processed via a complicated day-long "optical cleaning" procedure at elevated temperature above 180° C. [7].

Part 2—A Thin-Layer of Titanium Oxide $TiO_2$ Substantially Eliminates the Photorefractive Effect in Thin-Film Lithium Niobate A new approach to substantially eliminate the photorefractive effect in thin-film lithium niobate is described in detail hereinbelow. We realized that the photorefractive effect can be quenched by coating the lithium niobate with a thin-layer of material. We realized, for example, that a thin-layer of titanium oxide $TiO_2$ substantially eliminates the photorefractive effect in thin-film lithium niobate. A thin-layer of titanium oxide $TiO_2$ having a thickness from about 1 nm to about 1000 nm can be used.

FIG. 1A to FIG. 1E show exemplary structures to substantially eliminate the photorefractive effect in thin-film lithium niobate according to the Application. FIG. 1A is a drawing showing a legend of materials which follow in FIG. 1B to FIG. 1E. FIG. 1B is a drawing showing a cross section of a waveguide including a coating of a thin-layer of titanium oxide on the surface of lithium niobate according to the Application. FIG. 1C is a drawing showing a three dimensional cross section of the waveguide of FIG. 1B. FIG. 1D is a drawing showing a cross section of another type of waveguide including a coating of a thin-layer of titanium oxide on the surface of lithium niobate according to the Application. FIG. 1E is a drawing showing a three dimensional cross section of the waveguide of FIG. 1D.

A thin-film LN photonic waveguide sits on a silicon oxide layer, such as an $SiO_2$ substrate. A thin-layer of titanium oxide is directly coated on the surface of LN waveguide. Above the whole waveguide structure, the top cladding can be either air (FIG. 1B and FIG. C) or silicon oxide (FIG. 1D and FIG. 1E) or another low-index medium. The crystal orientation of the LN layer can be either x-cut, z-cut, or y-cut. Titanium oxide cladding has been used to engineer the thermo-optic properties of silicon and silicon nitride photonic waveguides [8, 9, 10, 11]. However, to our best understanding, titanium oxide cladding has never been applied to address the photorefractive effect.

FIG. 2A to FIG. 2K show more exemplary variations of waveguide structures to substantially eliminate the photorefractive effect in thin-film lithium niobate according to the Application.

Figure 2H:
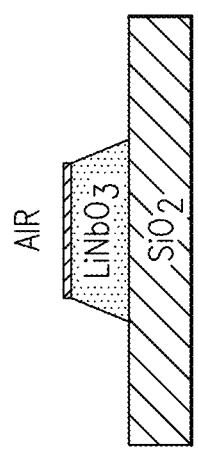
FIG. 2H is a drawing showing yet another exemplary waveguide structure which can be partially covered with titanium oxide.
Figure 2I:
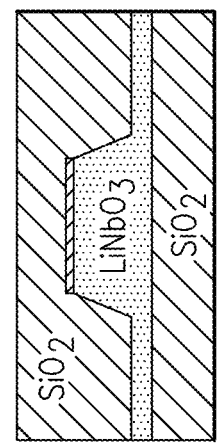
FIG. 2I is a drawing showing yet another exemplary waveguide structure which can be partially covered with titanium oxide.
Figure 2J:
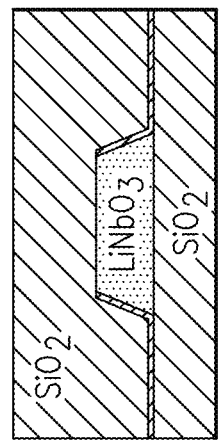
FIG. 2J is a drawing showing yet another exemplary waveguide structure which can be partially covered with titanium oxide.
Figure 2K:
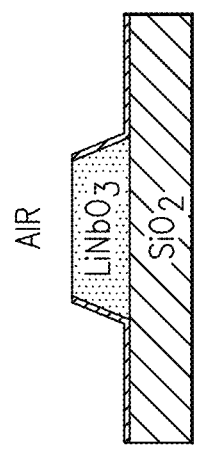
FIG. 2K is a drawing showing yet another exemplary waveguide structure which can be partially covered with titanium oxide.

FIG. 2A is a drawing showing a legend of materials which follow in FIG. 2B to FIG. 2K. FIG. 2B is a drawing showing an exemplary ridge-like waveguide geometry. FIG. 2C is a drawing showing another exemplary ridge-like waveguide geometry. FIG. 2D is a drawing showing an exemplary waveguide structure where the titanium oxide layer can be placed beneath the LN layer. FIG. 2E is a drawing showing another exemplary waveguide structure where the titanium oxide layer can be placed beneath the LN layer. FIG. 2F is a drawing showing an exemplary waveguide structure which can be partially covered with titanium oxide. FIG. 2G is a drawing showing another exemplary waveguide structure which can be partially covered with titanium oxide. FIG. 2H is a drawing showing yet another exemplary waveguide structure which can be partially covered with titanium oxide. FIG. 2I is a drawing showing yet another exemplary waveguide structure which can be partially covered with titanium oxide. FIG. 2J is a drawing showing yet another exemplary waveguide structure which can be partially covered with titanium oxide. FIG. 2K is a drawing showing yet another exemplary waveguide structure which can be partially covered with titanium oxide. As long as the thin titanium oxide layer has direct contact with an adequate portion of the surface of the LN waveguide, the new method will work to substantially eliminate the photorefractive effect in thin-film lithium niobate, by coating the LN waveguide with a thin-layer of certain material that will quench the photorefractive effect.

Part 3—Experimental Verification

Figure 3A:
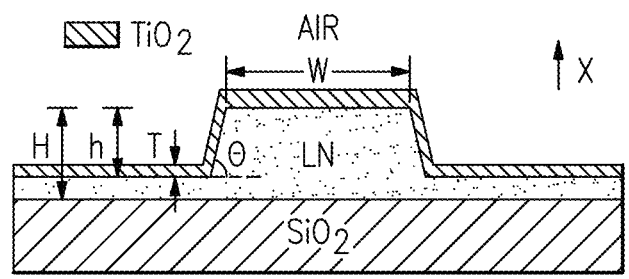
FIG. 3A is a drawing showing a schematic diagram of the waveguide cross section of an exemplary fabricated devices used for the experimental verification.
Figure 3B:
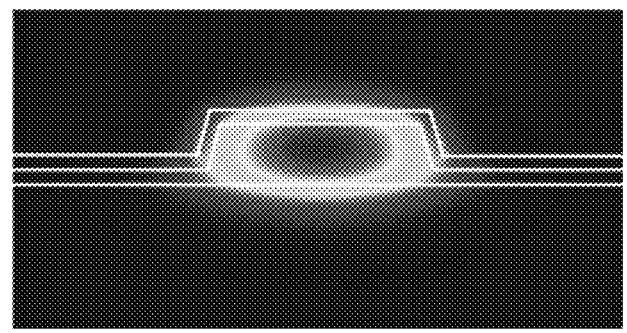
FIG. 3B is a drawing showing a simulated optical mode field profile of the fundamental quasi-TE guided mode in the $TiO_2$-cladded $LiNbO_3$ waveguide of FIG. 3A.
Figure 3C:
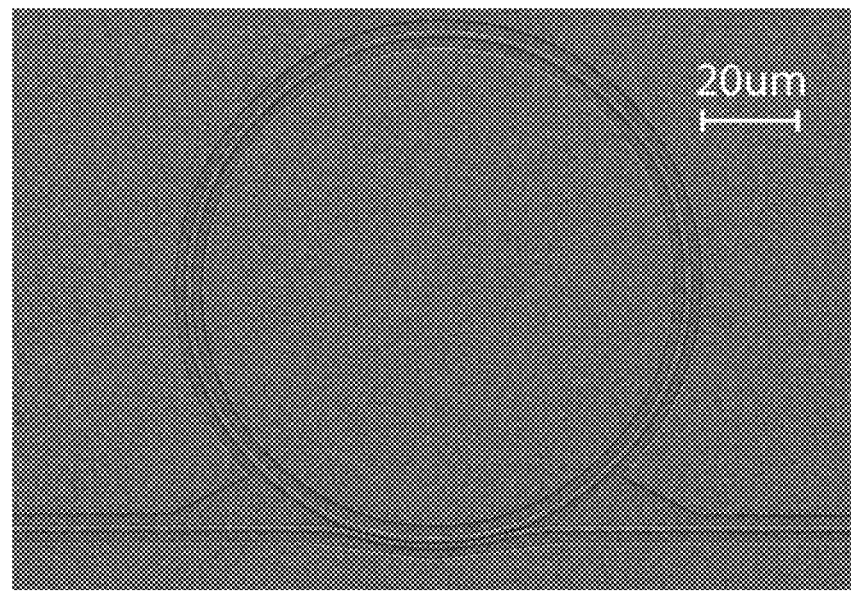
FIG. 3C is a drawing showing a scanning electron microscopic image of a fabricated microring resonator.
Figure 3D:
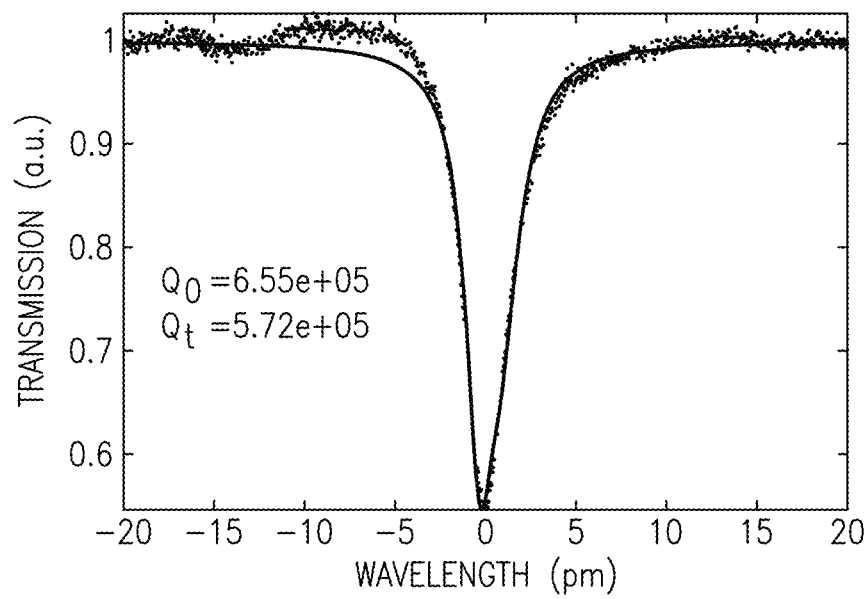
FIG. 3D is a graph showing a cavity resonance of a bare lithium niobate microring resonator without the titanium oxide cladding.
Figure 3E:
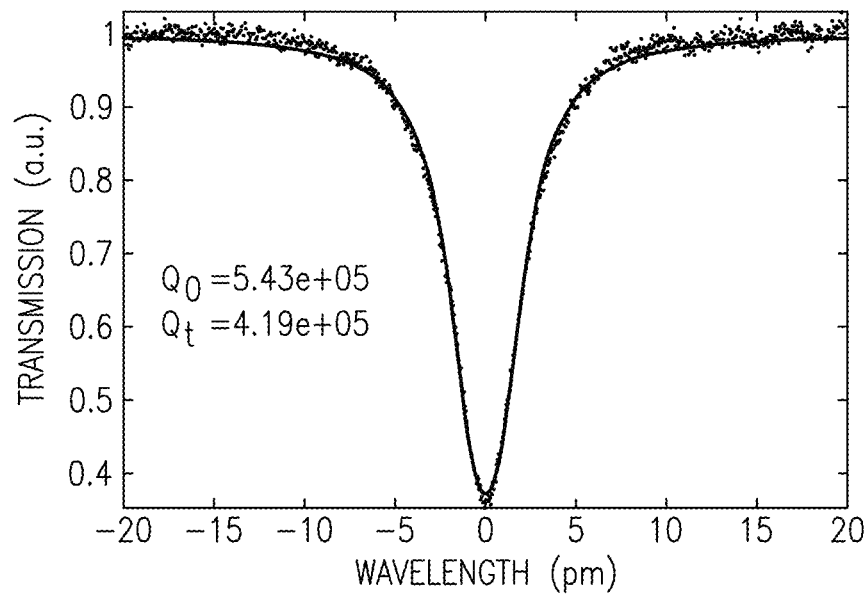
FIG. 3E is a graph showing a cavity resonance of a lithium niobate microring resonator with titanium oxide cladding according to FIG. 3A.

FIG. 3A to FIG. 3E show experimental verification of the new structures and method to substantially eliminate the photorefractive effect in thin-film lithium niobate of the Application. FIG. 3A is a drawing showing a schematic diagram of the waveguide cross section of exemplary fabricated devices used for the experimental verification. The waveguide structure of FIG. 3A is the same as shown in FIG. 1B. FIG. 3B is a drawing showing a simulated optical mode field profile of the fundamental quasi-TE guided mode in the $TiO_2$-cladded $LiNbO_3$ waveguide of FIG. 3A. FIG. 3C is a drawing showing a scanning electron microscopic image of a fabricated microring resonator. FIG. 3D is a graph showing a cavity resonance of a bare lithium niobate microring resonator without the titanium oxide cladding. FIG. 3E is a graph showing a cavity resonance of a lithium niobate microring resonator with titanium oxide cladding according to FIG. 3A.

Example—A LN microring fabricated device according to FIG. 3A has a layer thickness of H=600 nm, etched down by 410 nm with h=190 nm, and a sidewall angle of θ=75°. The microring and the coupling waveguide have a waveguide width of W=1.8 and 1.2 μm, respectively. A 120-nm-thick $TiO_2$ layer was deposited on top surface of the LN waveguide via physical vapor deposition (The current thickness of the titanium oxide layer was chosen to suppress the thermo-optic sensitivity, but to eliminate the photorefractive effect, other thickness of the $TiO_2$ layer could also be used as well.) The simulated optical mode profile (FIG. 3B), in which the optical mode is primarily confined inside the LN waveguide core. As shown in FIG. 3D, before coating with a $TiO_2$ cladding, the LN microring resonator exhibits an intrinsic and loaded optical Q of $6.55 \times 10^5$ and $5.72 \times 10^5$, respectively, in the telecom band around 1540 nm. After coating with the $TiO_2$ cladding, the optical Q of the microring remains nearly intact, as shown in FIG. 3E, with an intrinsic and loaded optical Q of $5.43 \times 10^5$ and $4.19 \times 10^5$, respectively. This example shows the high quality of $TiO_2$ layer deposition.

Figure 4A:
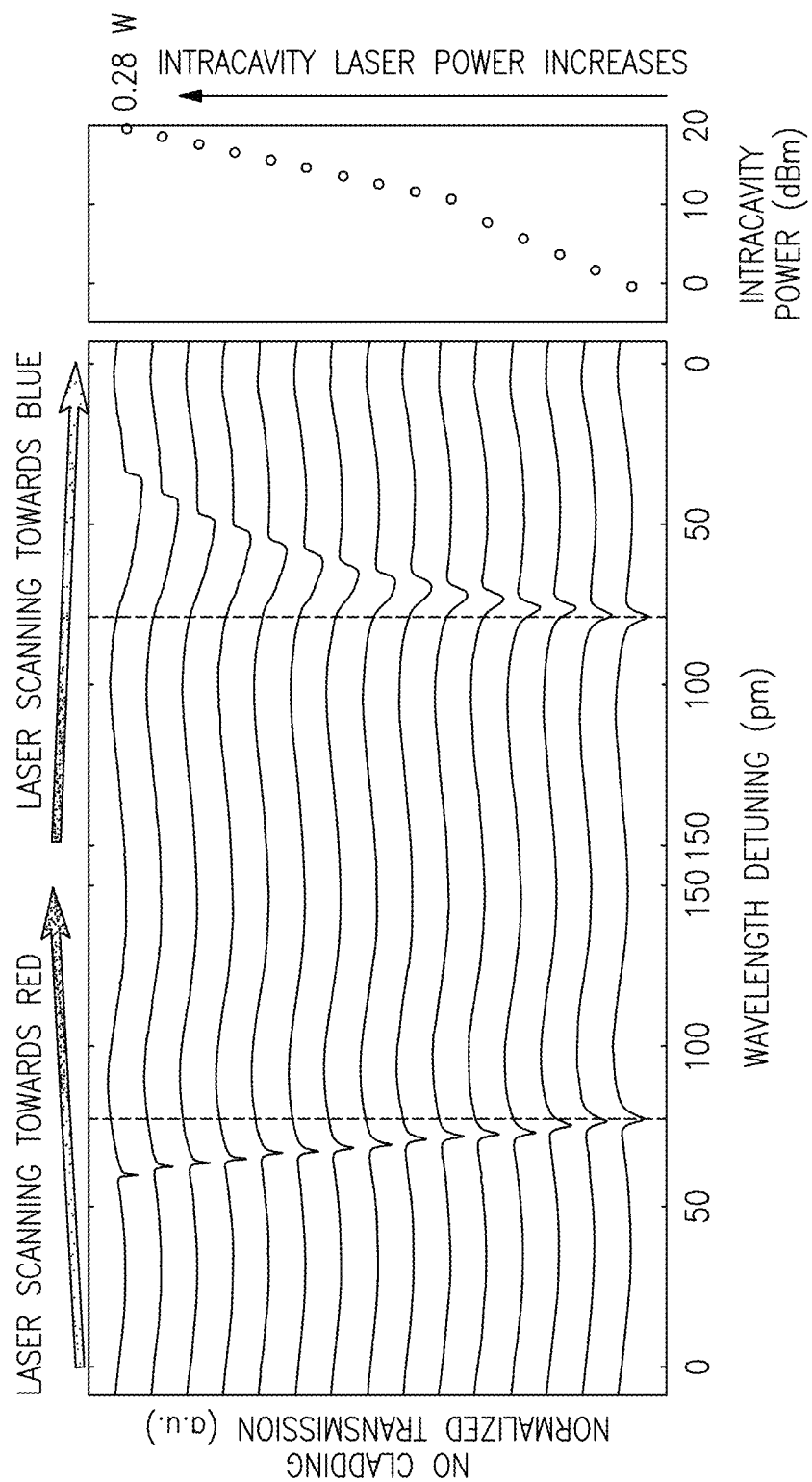
FIG. 4A is a graph showing a laser-scanned transmission spectrum of a cavity resonance when the optical power changes inside the microring resonators for a bare lithium niobate microring resonator without titanium oxide cladding.
Figure 4B:
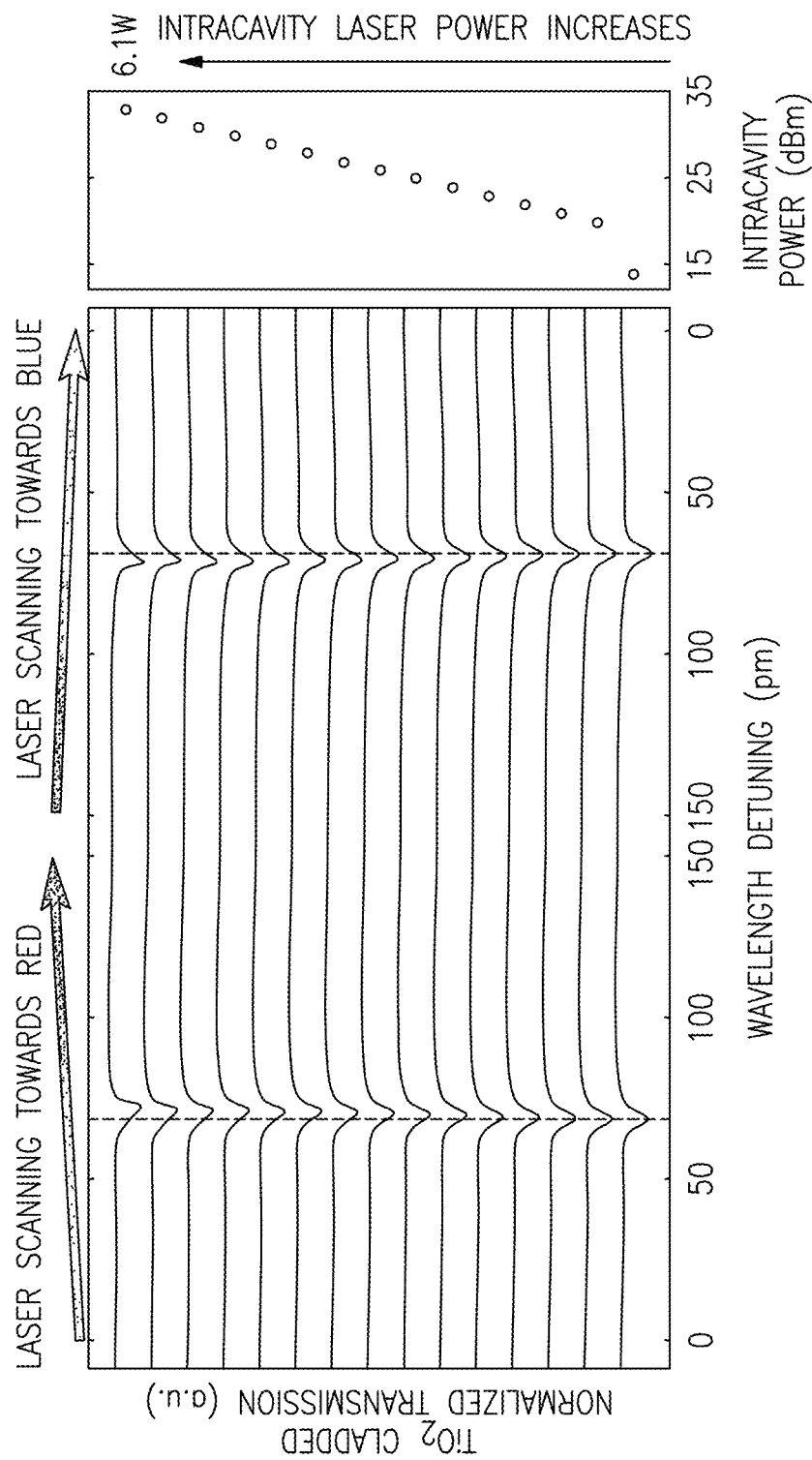
FIG. 4B is a graph showing a laser-scanned transmission spectrum of a cavity resonance when the optical power changes inside the microring resonators for a lithium niobate microring resonator with a titanium oxide cladding.

FIG. 4A and FIG. 4B show the laser-scanned transmission spectrum of a cavity resonance when the optical power changes inside the microring resonators. The laser was scanned back and forth across the cavity resonance and the light transmission from the resonators was monitored.

FIG. 4A is a graph showing normalized transmission for a bare LN microring resonator without the titanium oxide cladding, where the transmission spectrum is dramatically distorted, and the resonance wavelength is significantly shifted when the optical power increases inside the resonator. This is a combined effect of therm-optic nonlinear effect and photorefractive effect.

FIG. 4B is a graph showing normalized transmission for the LN microring resonator with a titanium oxide cladding. The transmission spectrum remains nearly intact and the wavelength position of the cavity resonance remains fixed even when the optical power increases to about 6.1 W inside the cavity, indicating that both the thermo-optic nonlinear effect and the photorefractive effect are eliminated in the resonator.

Example—To test the temperature sensitivity of the devices, the device temperature was changed, and the wavelength drift of the cavity resonance was monitored.

Figure 5A:
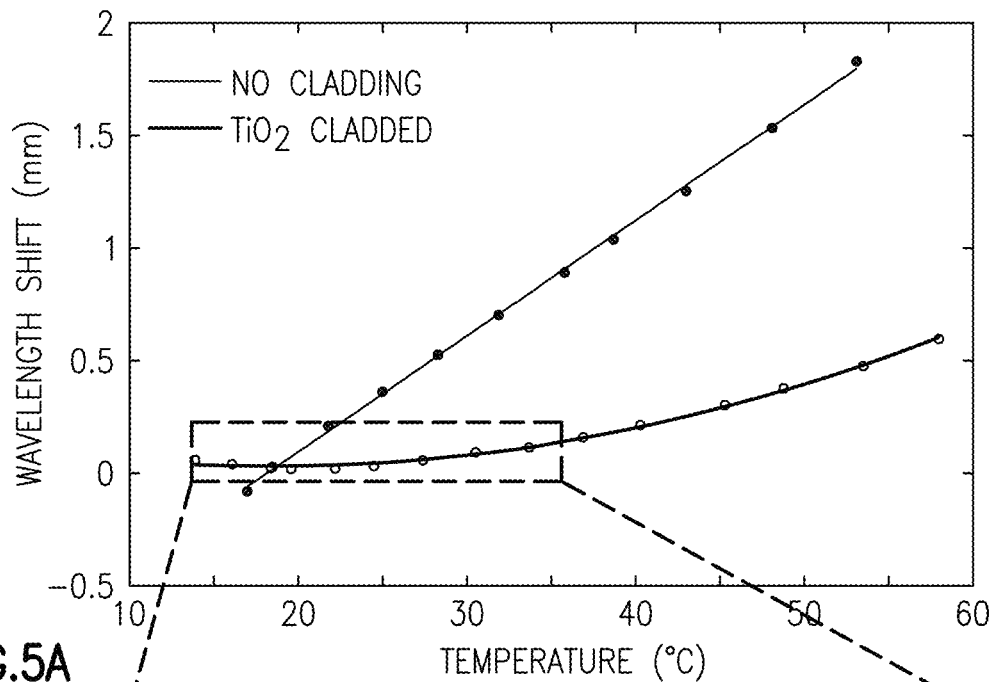
FIG. 5A is a graph showing the resonance shift (relative to 1542 nm) vs. temperature curve for both a $TiO_2$ cladded and an intrinsic LN device.
Figure 5B:
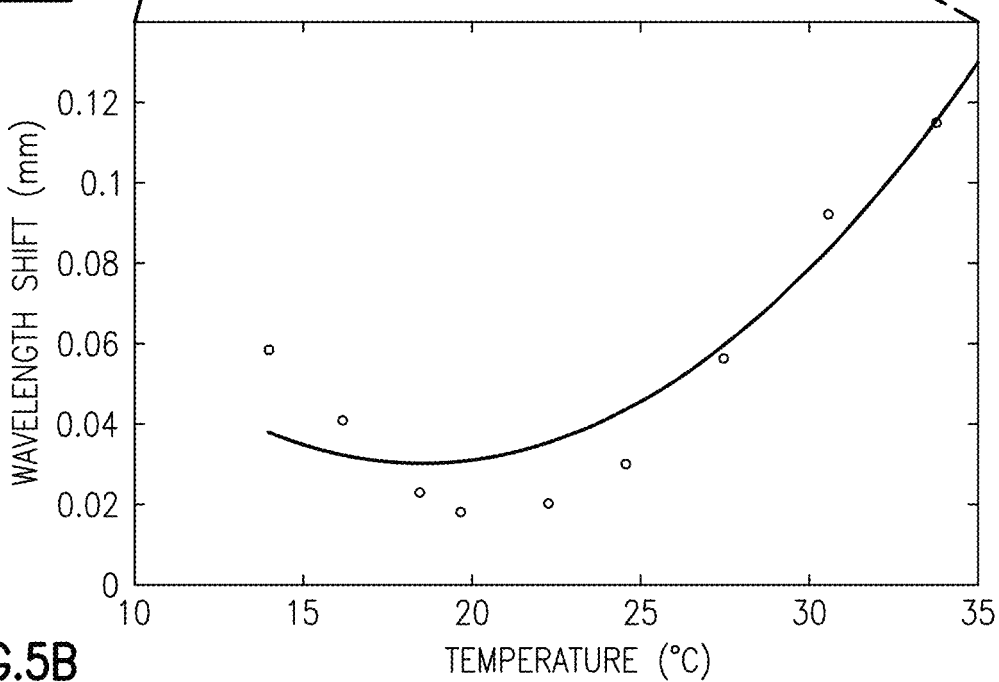
FIG. 5B is a graph showing curve fitted to data of the zoom box of FIG. 5A.

FIG. 5A to FIG. 5F show the experimental results. FIG. 5A is a graph showing the resonance shift (relative to 1542 nm) vs. temperature curve for both $TiO_2$ cladded and intrinsic LN device. FIG. 5B is a graph showing curve fitted to data of the zoom box of FIG. 5A. The discrepancy between data and fitted curve is caused by higher order thermo-optic coefficient (TOC). FIG. 5C is a graph showing normalized transmission with no cladding. FIG. 5D is a graph showing normalized transmission with a $TiO_2$ cladding. FIG. 5E and FIG. 5F show the input on-chip power curve for intrinsic and cladded LN devices. FIG. 5E is a graph showing input laser power for the graph of FIG. 5C. FIG. 5F is a graph showing input laser power for the graph of FIG. 5D.

As shown in the red curve of FIG. 5A, the cavity resonance of the bare LN microring depends linearly with temperature with a slope of 52.9 pm/K. In contrast, the temperature dependence is significantly suppressed in the $TiO_2$ added LN microring, as shown clearly by the green curve in FIG. 5A. As shown in FIG. 5B, the slope of temperature dependence decreases to zero at room temperature, leaving a slight quadratic dependence on temperature, with only about 30 pm for temperature in the range between 15 and 25° C.

Of particular interest is that the $TiO_2$ cladding modifies dramatically the nonlinear optical behavior of the microring resonator. To show this feature, the optical power launched into the resonator was increased. As shown in FIG. 5C, when the input optical power was increased from −24 dBm to −4 dBm. A significant nonlinearity-induced bistability appeared in the bare LN microring without the $TiO_2$ cladding. This phenomenon arises from a combined effect of thermo-optic nonlinearity and the photorefractive effect, where the latter also shifts the overall cavity resonance towards blue. In strong contrast, in the $TiO_2$-cladded LN microring, the Lorentzian shape of the cavity resonance remains nearly intact (substantially unaffected) for optical power up to about 8 dBm, indicating a negligible effect of thermo-optic nonlinearity. In particular, intriguingly, the overall cavity resonance wavelength remains constant (as indicated by the dashed line), implying a complete quenching of the photorefractive effect.

In summary, we have demonstrated $TiO_2$-cladded LN ring resonators with optical Q up to about $4 \times 10^5$, cancelled first-order thermo-optic effect at room temperature, and quenched photorefraction. The significantly enhanced temperature stability and power handling capability of the demonstrated LN/$TiO_2$ hybrid athermal devices shows great potential for stable and highly efficient operation of electro-optic signal processing and high power nonlinear photonics. Note that ring resonators of any suitable Q can be used, including ring resonators having a Q of up to about $4 \times 10^5$ the relatively high Q of a LN ring resonator made possible by the new $TiO_2$ cladding according to the Application.

More generally, beyond the experimental implementations described hereinabove for $TiO_2$-cladded LN ring resonators, the new method and device for substantially eliminating optical damage in lithium niobate devices applies to any suitable type of lithium niobate devices, typically in the form of integrated optical devices and integrated optoelectronic devices, including photonic integrated circuits (PIC) and planar lightwave circuits.

Figure 6F:
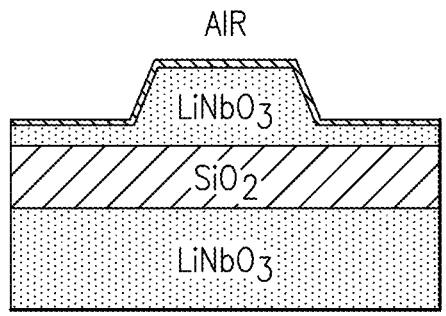
FIG. 6F shows an exemplary waveguide with $TiO_2$ cladding supported by a buried oxide on a lithium niobate substrate.
Figure 6H:
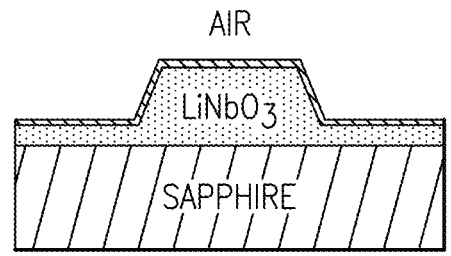
FIG. 6H shows an exemplary waveguide with $TiO_2$ cladding supported by a sapphire substrate.
Figure 6G:
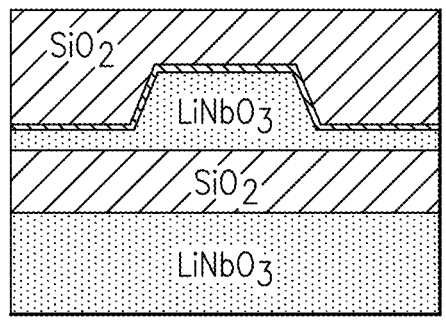
FIG. 6G shows the structure of FIG. 6F with an additional layer of $SiO_2$ over the $TiO_2$ cladding (on top of the $TiO_2$ cladded waveguide)
Figure 6I:
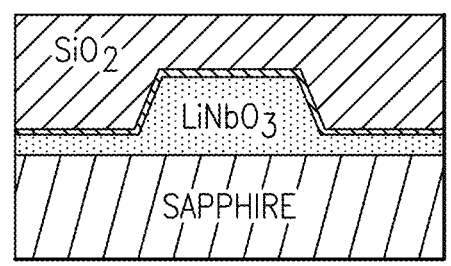
FIG. 6I shows the structure of FIG. 6H with an additional layer of $SiO_2$ over the $TiO_2$ cladding (on top of the $TiO_2$ cladded waveguide).

Substrates—A variety of substrates can be used for the method and device for substantially eliminating optical damage in lithium niobate devices as described hereinabove according to the Application. FIG. 6A to FIG. 6I show several more exemplary structural configurations. FIG. 6A is a drawing showing a legend of materials which follow in FIG. 6B to FIG. 6I. FIG. 6B shows an exemplary waveguide with $TiO_2$ cladding supported by a silicon oxide substrate ($SiO_2$ included in our definition of silicon oxide). FIG. 6C shows the structure of FIG. 6B with an additional layer of $SiO_2$ over the $TiO_2$ cladding (on top of the $TiO_2$ cladded waveguide). FIG. 6D shows an exemplary waveguide with $TiO_2$ cladding supported by a buried oxide on a silicon substrate. FIG. 6E shows the structure of FIG. 6D with an additional layer of $SiO_2$ over the $TiO_2$ cladding (on top of the $TiO_2$ cladded waveguide). FIG. 6F shows an exemplary waveguide with $TiO_2$ cladding supported by a buried oxide on a lithium niobate substrate. FIG. 6G shows the structure of FIG. 6F with an additional layer of $SiO_2$ over the $TiO_2$ cladding (on top of the $TiO_2$ cladded waveguide). FIG. 6H shows an exemplary waveguide with $TiO_2$ cladding supported by a sapphire substrate. FIG. 6I shows the structure of FIG. 6H with an additional layer of $SiO_2$ over the $TiO_2$ cladding (on top of the $TiO_2$ cladded waveguide).

Figure 7A:
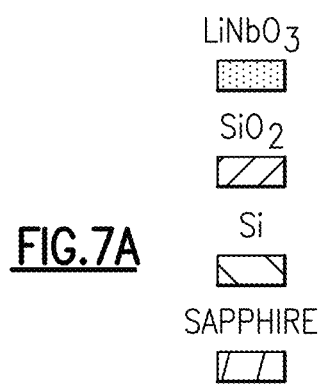
FIG. 7A is a drawing showing a legend of materials which follow in FIG. 7B to FIG. 7D.
Figure 7B:
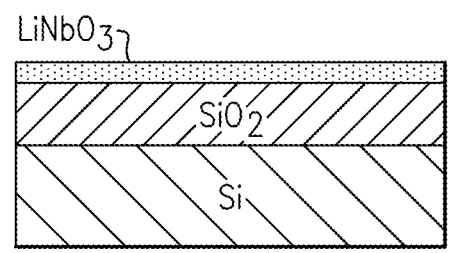
FIG. 7B shows an exemplary commercially available Lithium niobate-on-insulator wafer.
Figure 7C:
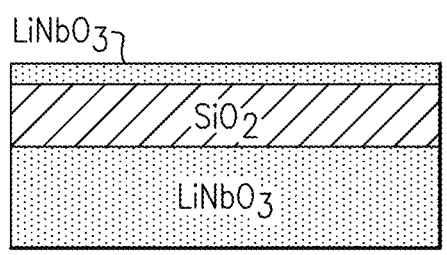
FIG. 7C shows another exemplary Lithium niobate-on-insulator wafer.
Figure 7D:
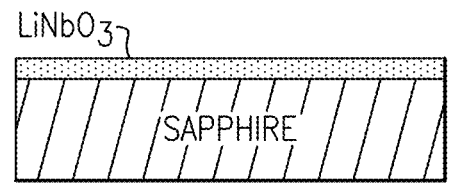
FIG. 7D shows an exemplary lithium niobate-on-sapphire wafer.

FIG. 7A to FIG. 7D show exemplary commercially available wafers and exemplary wafers using during laboratory verification implementations. Commercial wafers, such as lithium-niobate-on-insulator wafers, are available for example, from NANOLN, of Jinan, P. R. China, are typically supplied as, for example, about 3" or 4" wafers. FIG. 7A is a drawing showing a legend of materials which follow in FIG. 7B to FIG. 7D. FIG. 7B shows an exemplary commercially available Lithium niobate-on-insulator wafer. FIG. 7C shows another exemplary Lithium niobate-on-insulator wafer. FIG. 7D shows an exemplary lithium niobate-on-sapphire wafer.

Manufacturing and Fabrication

The waveguide of the Application can be fabricated from a LN layer bonded directly or indirectly to the substrate by any suitable method. Typically, the waveguide is etched by any suitable lithography and/or etching method.

A $TiO_2$ coated waveguide of the new method and device for substantially eliminating optical damage in lithium niobate devices of the application, can be manufactured and/or fabricated by any suitable technique. During implementation experiments, the $TiO_2$ coating was created by deposition. The $TiO_2$ layer can be deposited by any suitable methods such as, for example, physical vapor deposition (PVD), chemical vapor deposition (CVD) (including some variants such as PECVD LPCVD PACVD), liquid phase deposition (LPD) (including sol-gel, dip-coating, spinning coating), atomic layer deposition (ALD), photopatterned self-assembled monolayer, flame hydrolysis deposition, and oxidation of deposited titanium layer.

Note that in some integrated structures, such as, for example, FIG. 2D, FIG. 2E, there can be a $TiO_2$ layer below the waveguide layer (i.e. between the waveguide and the substrate). Note also, that for many types of substrates, there is also a low index layer (e.g. $SiO_2$) disposed between either the waveguide and the substrate, or in some structures, the $TiO_2$ clad structure and the waveguide. For example, a LN waveguide formed directly over a LN substrate would not have useable waveguide light guiding properties, because both the waveguide and substrate would have the same refractive properties.

Alternative Coatings to the $TiO_2$ coating—The following materials are believed to be alternatives for the $TiO_2$ coating: silicon (Si), zinc oxide (ZnO), zirconium dioxide ($ZrO_2$), tin oxide ($SnO_2$), indium tin oxide (ITO). These materials possess properties similar to $TiO_2$, and as such, are also useful to minimize or to substantially eliminate the photorefractive effect to some extent for a LN waveguide, in the same way as the $TiO_2$ coating described hereinabove.

Software for designing, modeling, and analyzing waveguides including a coating of a thin-layer of titanium oxide on the surface of lithium niobate according to the Application can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] E. L. Wooten, et al, "A review of lithium niobate modulators for fiber-optic communications systems," IEEE J. Sel. Top. Quant. Electron. 6, 69 (2000).
[2] L. Arizmendi, "Photonic applications of lithium niobate crystals," phys. stat. sol. (a) 201, 253 (2004).
[3] L. E. Myers, et al, "Quasi-phase-matched optical parametric oscillators in bulk periodically poled LiNbO3," J. Opt. Soc. Am. B 12, 2102 (1995).
[4] C. S. Lam, "A review of the timing and filtering technologies in smartphones," IEEE International Frequency Control Symposium (IFCS) 2016, pp. 1-6(2016).
[5] P. Gunter and J.-P. Huignard, eds., "Photorefractive materials and their application 2," (Springer, 2007).
[6] Y. Kong, S. Liu, and J. Xu, "Recent Advances in the Photorefraction of Doped Lithium Niobate Crystals," Materials 5, 1954 (2012).
[7] M. Kösters, et al, "Optical cleaning of congruent lithium niobate crystals," Nature Photon. 3, 510 (2009).
[8] S. S. Djordjevic, et al, "CMOS-compatible, athermal silicon ring modulators clad with titanium dioxide," Opt. Express 21, 13958 (2013).
[9] B. Guha, et al, "Athermal silicon microring resonators with titanium oxide cladding," Opt. Express 21, 26557 (2013).
[10] Qiu, et al, "Complementary metal-oxide-semiconductor compatible athermal silicon nitride/titanium dioxide hybrid micro-ring resonators," Appl. Phys. Lett. 102, 051106 (2013).
[11] S. Feng, et al, "Athermal silicon ring resonators clad with titanium dioxide for 1.3 µm wavelength operation," Opt. Express 23, 25653 (2015).
[12] J. Teng, P. Dumon, W. Bogaerts, H. Zhang, X. Jian, X. Han, M. Zhao, G. Morthier, and R. Baets, Athermal silicon-on-insulator ring resonators by overlaying a polymer claddingon narrowed waveguides, Opt. express 17, 14627-14633(2009).
[13] F. Qiu, A. M. Spring, F. Yu, and S. Yokoyama, Complementary metal oxide semiconductor compatible athermal silicon nitride/titanium dioxide hybrid micro-ring resonators, Appl. Phys. Lett. 102, 051106 (2013).
[14] T. Lipka, Lennart Moldenhauer, J. Müller, and H. Khiem Trieu, Athermal and wavelength-trimmable photonic filters based on $TiO_2$-cladded amorphous-SOI, Opt. express 23, 20075-20088 (2015).
[15] S. Feng, K. Shang, J. T. Bovington, R. Wu, B. Guan, K.-T. Cheng, J. E. Bowers, and S. B. Yoo, Athermal silicon ring resonators clad with titanium dioxide for 1.3 µm wave-length operation, Opt. express 23, 25653-25660 (2015).

What is claimed is:

1. An integrated optical device comprising:
   a substrate;
   a waveguide core comprising a lithium niobate disposed on said substrate; and
   a $TiO_2$ coating having a thickness from about 1 nm to about 1000 nm disposed at least in part over a longitudinal surface of said waveguide core as a coated waveguide core supported by said substrate; and
   wherein a photorefractive effect in said waveguide core is substantially eliminated by said TiO2 coating.

2. The integrated optical device of claim 1, wherein said waveguide core is supported by a silicon substrate.

3. The integrated optical device of claim 1, wherein said waveguide core is supported by a silicon oxide substrate.

4. The integrated optical device of claim 1, wherein said waveguide core is supported by a lithium niobate substrate.

5. The integrated optical device of claim 1, wherein said waveguide core is supported by a sapphire substrate.

6. The integrated optical device of claim 1, wherein said $TiO_2$ coating comprises a thin-layer of $TiO_2$ having a thickness between about 1 nm and 1000 nm.

7. The integrated optical device of claim 1, wherein said TiO2 coating is disposed between said waveguide core and a silicon oxide substrate.

8. The integrated optical device of claim 1, further comprising a silicon oxide cladding disposed over a top surface of said waveguide core.

9. The integrated optical device of claim 1, further comprising a silicon oxide cladding disposed over said $TiO_2$ coating.

10. The integrated optical device of claim 1, wherein said waveguide core comprises a ring resonator.

11. The integrated optical device of claim 9, wherein a wavelength of a cavity resonance remains substantially unaffected for optical power up to about 6.1 w inside the resonator.

12. The integrated optical device of claim 9, wherein said ring resonator comprises an optical Q up to about $4\times10^5$, wherein a photorefractive effect is substantially eliminated by said TiO2 coating.

13. The integrated optical device of claim 1, comprising a device cross section of a bottom surface of said waveguide core disposed on a $SiO_2$ substrate, said $TiO_2$ coating substantially covering a top surface of said waveguide core, and a $TiO_2$ coating top surface exposed to an air.

14. The integrated optical device of claim 1, comprising a device cross section of a bottom surface of said waveguide core disposed on a $SiO_2$ substrate, said $TiO_2$ coating substantially covering a top surface of said waveguide core, and a $TiO_2$ top surface covered by $SiO_2$ layer.

15. The integrated optical device of claim 1, comprising a device cross section of a $TiO_2$ coating disposed between a $SiO_2$ substrate and said waveguide core.

16. The integrated optical device of claim 1, comprising a device cross section of a bottom surface of said waveguide core disposed on a $SiO_2$ substrate, and said $TiO_2$ coating is disposed on at least a right side or a left side of said waveguide core, wherein a $SiO_2$ layer or an air covers a top surface of said waveguide core.

17. The integrated optical device of claim 1, wherein a $SiO_2$ surrounds said device in cross section.

18. An integrated optical device comprising:
a substrate;
a waveguide core comprising a lithium niobate disposed on said substrate; a $TiO_2$ coating having a thickness from about 1 nm to about 1000 nm disposed at least in part over a surface of said waveguide core on at least either of a top surface of said waveguide core or a bottom surface of said waveguide core; and a silicon oxide substantially covers and surrounds the waveguide core in cross section over a longitudinal direction of said waveguide core as an optical cladding; and wherein a photorefractive effect in said waveguide core is substantially eliminated by said $TiO_2$ coating.

19. A method for substantially eliminating optical damage in lithium niobate devices comprising: providing a substrate; performing at least one of: fabricating a waveguide core comprising a lithium niobate on said substrate, and depositing a $TiO_2$ coating having a thickness from about 1 nm to about 1000 nm over at least a part of a side along a longitudinal length of said waveguide core, or depositing a $TiO_2$ coating over at least a portion of said substrate and fabricating said waveguide core on said $TiO_2$ coating; thereby substantially eliminating a photorefractive effect in said lithium niobate waveguide core.

20. An integrated optical device comprising: a substrate; a waveguide core comprising a lithium niobate; and a coating having a thickness from about 1 nm to about 1000 nm disposed at least in part over a longitudinal surface of said waveguide core as a coated waveguide core supported by said substrate, said coating comprising at least one of: a silicon (Si), a zinc oxide (ZnO), a zirconium dioxide ($ZrO_2$), a tin oxide ($SnO_2$), and an indium tin oxide (ITO); and wherein a photorefractive effect in said waveguide core is substantially eliminated by said coating.

21. An integrated optical device comprising: a substrate; a waveguide core comprising a lithium niobate disposed on said substrate; a $TiO_2$ coating disposed at least in part over a longitudinal surface of said waveguide core as a coated waveguide core supported by said substrate; and comprising a device cross section of a bottom surface of said waveguide core disposed on a $SiO_2$ substrate, said $TiO_2$ coating substantially covering a top surface of said waveguide core, and a $TiO_2$ top surface covered by $SiO_2$ layer.

* * * * *

UNITED STATES PATENT AND TRADEMARK OFFICE
CERTIFICATE OF CORRECTION

PATENT NO. : 11,366,268 B2
APPLICATION NO. : 17/019485
DATED : June 21, 2022
INVENTOR(S) : Qiang Lin et al.

It is certified that error appears in the above-identified patent and that said Letters Patent is hereby corrected as shown below:

In the Claims

At Column 10, Claim number 1, Line number 63, delete "TiO2" and replace with -- $TiO_2$ --

At Column 11, Claim number 7, Line number 9, delete "TiO2" and replace with -- $TiO_2$ --

At Column 11, Claim number 12, Line number 27, delete "TiO2" and replace with -- $TiO_2$ --

Signed and Sealed this
Second Day of August, 2022

*Katherine Kelly Vidal*
Katherine Kelly Vidal
*Director of the United States Patent and Trademark Office*